No. 787,479. PATENTED APR. 18, 1905.
J. R. TANNER.
CENTERING MOTOR.
APPLICATION FILED SEPT. 2, 1903.
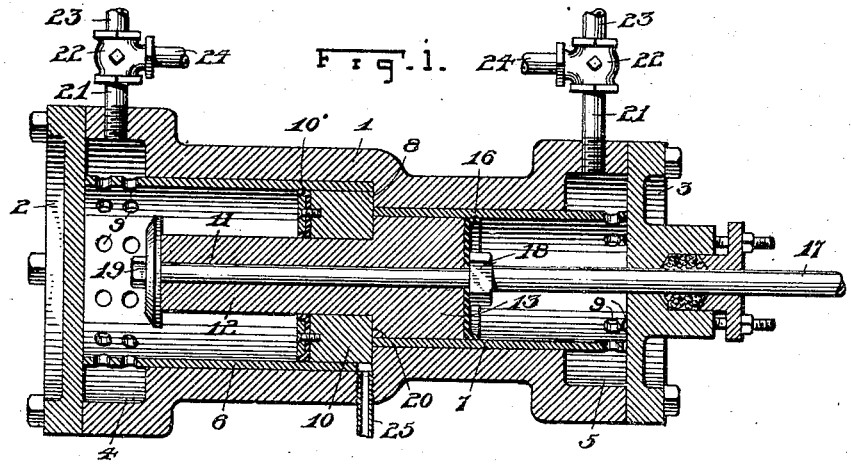
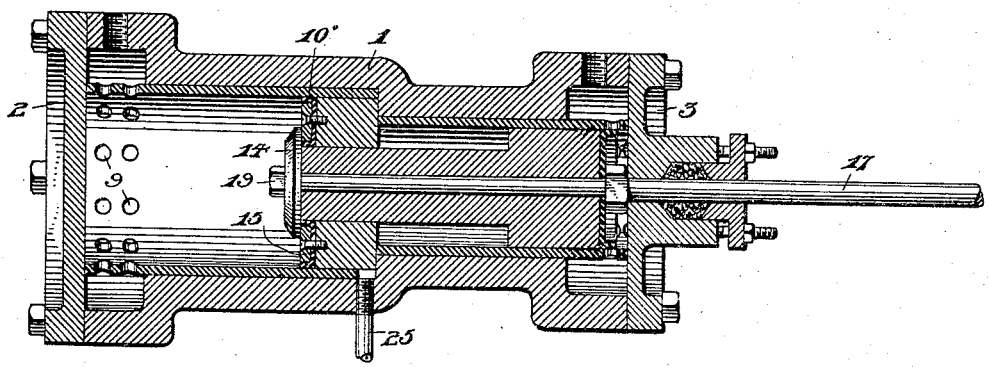
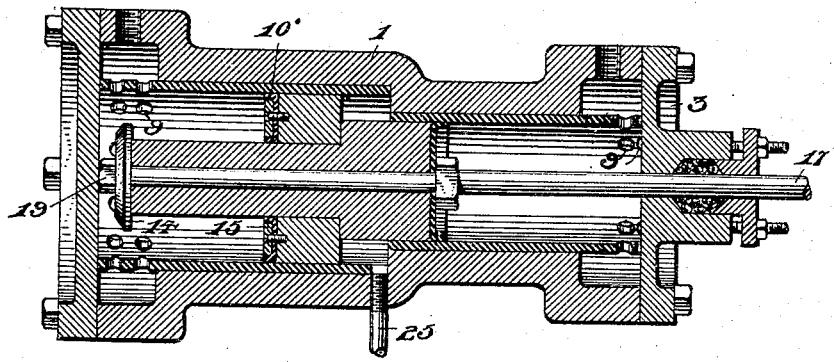
WITNESSES:
J. P. Appleman,
F. N. Barber
INVENTOR:
Julius R. Tanner,
by Wm. L. Pierce,
his Attorney.

No. 787,479. Patented April 18, 1905.

UNITED STATES PATENT OFFICE.

JULIUS R. TANNER, OF PITTSBURG, PENNSYLVANIA.

CENTERING-MOTOR.

SPECIFICATION forming part of Letters Patent No. 787,479, dated April 18, 1905.

Application filed September 2, 1903. Serial No. 171,642.

*To all whom it may concern:*

Be it known that I, JULIUS R. TANNER, a citizen of the United States, residing at Pittsburg, in the county of Allegheny and State of Pennsylvania, have invented or discovered new and useful Improvements in Centering-Motors, of which the following is a specification.

My invention relates to centering-motors particularly designed for operating motor-valves having three positions, but is in no wise limited to such mechanism.

It is the object of my invention to provide a centering-motor having but few movable parts, which normally occupy a central or inactive position, but which may by a similar simple operation be returned without fail and held securely in such central position.

Referring to the drawings, Figure I is a longitudinal section of my motor, showing the operating parts in their central position. Fig. II is a similar view showing the movable parts of the motor at their right-hand extreme position. Fig. III is a similar view showing said movable parts at their left-hand extreme position.

1 designates the casing of my motor, which is provided with end caps 2 and 3. The casing is provided at its ends with enlarged annular chambers 4 and 5, the former having a larger radius than the latter. The casing is provided with two cylindrical linings 6 and 7, the former having a greater diameter than the latter and their inner ends lying in the same plane. By reason of the cylinder 6 being larger than the cylinder 7 an internal annular shoulder 8 is formed about the center of the casing, longitudinally considered. These linings are provided with a number of ports 9, which connect the interior of the linings with their adjacent chambers 4 and 5.

Slidable in the cylinder 6 is a ring 10, whose inner end may abut against the said shoulder 8, as shown in Figs. I and II. The outer end of this ring is provided with a packing-ring 10', having a U-shaped cross-section, its outer flange bearing against the inner surface of the cylinder and its inner annular flange forming a packing for the reduced portion 11 of the piston 12, its enlarged portion 13 being slidable in the smaller lining 7. The outer end of the reduced portion 11 is provided with a disk 14, which when the piston is in its extreme right-hand position, as shown in Fig. II, engages with the annular ring 15, which clamps the packing 10' against the ring 10. The outer end of the enlarged portion 13 of the piston is provided with a packing-disk whose annular flange bears against the inner surface of the lining 7.

A valve-rod 17 passes through the center of the cap 3 and through the axis of the piston 12, a nut 18 thereon bearing against the packing 16 and a nut 19 bearing against the outer face of the disk 14, the nuts clamping together the piston, the packing 16, and the disk 14, as shown in the several figures.

The annular shoulder 20 on the piston 12, made necessary by reason of the two diameters thereof, may when the piston is in the position shown in Figs. I and III engage with the right-hand end of the ring 10.

Chamber 4 is connected with the pipe 21, having therein an ordinary three-way valve 22, by which water may pass through the inlet-pipe 23, through the pipe 21, into chamber 4; but when the valve is moved to its other position water may pass from the chamber 4 through the pipe 21 and waste-pipe 24. The chamber 5 has also parts 21 to 24.

An air-vent and drainage-tube 25 is inserted into the casing and leads from the inner end of the lining 6 to the atmosphere of any desired place external to the casing.

A rod 17 will in practice be connected to some device which my motor is adapted to operate—for example, to the slide-valve of a hydraulic or other motor. When the parts are in a central position, as shown in Fig. I, the slide-valve will occupy a central position, causing the hydraulic or other motor to remain inactive. When the parts take the position shown in Fig. II, the slide-valve will be shifted, so as to operate the hydraulic or other motor in a certain direction, and when the parts are shifted, as shown in Fig. III, the hydraulic or other motor will be operated in the other direction.

The operation is as follows: When the valves 22 are so placed that pressure is admitted to both chambers 4 and 5 and the interior of both linings 6 and 7, the ring 10 and the piston 12 will take the position shown in Fig. I. The piston 12 will be forced to the left until it engages the ring 10, because the right-hand end 13 of the piston has a greater diameter than the left-hand end. When the shoulder 8 engages the ring 10, then the combined diameter of the ring 10 and the reduced portion 11 of the piston is greater than the right-hand end of the piston, whereby the parts will be held with the ring 10 against the shoulder 8 and the shoulder 20 against the ring 10. If now the right-hand valve 22 be turned so as to exhaust the water in the chamber 5 and lining 7 through the waste-pipe 24, the pressure will be removed from the large end of the piston and the pressure on the small end of the piston will move the same to the right-hand position, (shown in Fig. II;) but if, however, the left-hand valve 22 be turned so as to exhaust the water from the left-hand chamber 4 and lining 6 the pressure on the large end of the piston will shove the piston and ring 10 to the left-hand position, as shown in Fig. III. When the water is restored to the chamber from which the water has been exhausted, the movable parts of the motor will be returned to their normal central position, as shown in Fig. I.

The air-vent 25 is necessary to prevent a vacuum forming behind the ring 10 when it moves from the position shown in Fig. II to that shown in Fig. III, and it is also necessary to exhaust such water and air as may be between the ring and the shoulder 8 when the ring is returning to its normal or central position.

I do not limit the above-described invention to use with mechanism of any particular type, since it is adapted to any device to which it is attached having a central position or a position on either side of the central position.

I do not limit myself to the precise details shown and described above, but claim such changes as may fairly come within the scope of my invention.

Having described my invention, I claim—

1. In a centering-motor, a casing having a longitudinal opening consisting of two sections of different diameters, a lining in each section, an internal shoulder at the junction of the sections, a ring slidable in the larger section, a piston slidable in the smaller section and having a reduced portion slidable in the said ring, a rod secured to the piston to transmit the movement of the piston to a suitable point, a packing-ring seated on the outer end of the larger portion of said piston and bearing against the smaller lining, and a packing on the said ring bearing against the larger lining and the reduced portion of the piston, and means for supplying fluid-pressure to and exhausting it from the sections of the said opening in the casing, whereby the said piston may be caused to occupy a central position or a position on either side thereof.

2. In a centering-motor, a casing having a longitudinal opening consisting of two sections of different diameters, a lining in each section, an internal shoulder at the junction of the sections, an air-vent and waste pipe at the junction of the larger section and said shoulder, a ring slidable in the larger section, a piston slidable in the smaller section and having a reduced portion slidable in the said ring, a rod secured to the piston to transmit the movement of the piston to a suitable point, a packing-ring seated on the outer end of the larger portion of said piston and bearing against the smaller lining, and a packing on the said ring bearing against the larger lining and the reduced portion of the piston, and means for supplying fluid-pressure to and exhausting it from the sections of the said opening in the casing, whereby the said piston may be caused to occupy a central position or a position on either side thereof.

Signed at Pittsburg, Pennsylvania, this 31st day of August, 1903.

JULIUS R. TANNER.

Witnesses:
F. N. BARBER,
A. M. STEEN.